United States Patent [19]

Banschick

[11] Patent Number: 5,244,700
[45] Date of Patent: Sep. 14, 1993

[54] CENTERPIECE ASSEMBLY SIMULATING FLORAL BOUQUET

[76] Inventor: Kenneth Banschick, 30 Maple Dr., Great Neck, N.Y. 11021

[21] Appl. No.: 925,770

[22] Filed: Aug. 7, 1992

[51] Int. Cl.$^5$ ................................................ B32B 3/00
[52] U.S. Cl. ...................... 428/4; 47/41.12; 47/41.13; 47/41.14; 211/13; 428/23; 428/24
[58] Field of Search .................. 428/4, 23, 24; 47/41.12, 41.13, 41.14; 211/13

[56] References Cited

U.S. PATENT DOCUMENTS

| | | | |
|---|---|---|---|
| 781,414 | 1/1905 | Garnsey | 47/41.13 |
| 877,145 | 1/1908 | Waddel | 47/41.13 |
| 903,227 | 11/1908 | Pruden | 47/41.13 |
| 1,468,743 | 7/1921 | Porter | 428/23 |
| 2,686,989 | 7/1949 | Dillon et al. | 47/41.13 |
| 3,431,041 | 11/1965 | Fontlladosa | 428/34.4 |
| 3,768,202 | 10/1973 | Wheelock | 47/41.13 |
| 4,461,118 | 7/1984 | Fertig | 428/23 |

Primary Examiner—Patrick J. Ryan
Assistant Examiner—Abraham Bahta
Attorney, Agent, or Firm—Michael Ebert

[57] ABSTRACT

A centerpiece assembly in which an array of floral-like elements is supported on a rack to simulate a bouquet of cut flowers. Each element in the array has a stem formed by a transparent tubular wand filled with pellets of candy whose color imparts color to the stem. The lower end of the wand is provided with a removable stopper, the upper end having a decorative flower-like pom-pom attached thereto. The rack, fabricated of transparent material, is composed of a base plate having a center post anchored thereon on which are supported at least two tier plates, one above the other, each tier having a ring of equi-spaced holes therein coaxial with the center post. The upper tier ring has a diameter greater than that of the lower tier ring, whereby each hole in the upper ring is spaced a greater distance from the post than the corresponding hole in the lower ring. The wand of each floral-like element is inserted into a respective hole in the upper ring and the corresponding hole in the lower ring, with its lower end resting on the base, whereby the elements of the array are outwardly inclined and converge at the base to simulate a bouquet of cut flowers.

12 Claims, 4 Drawing Sheets

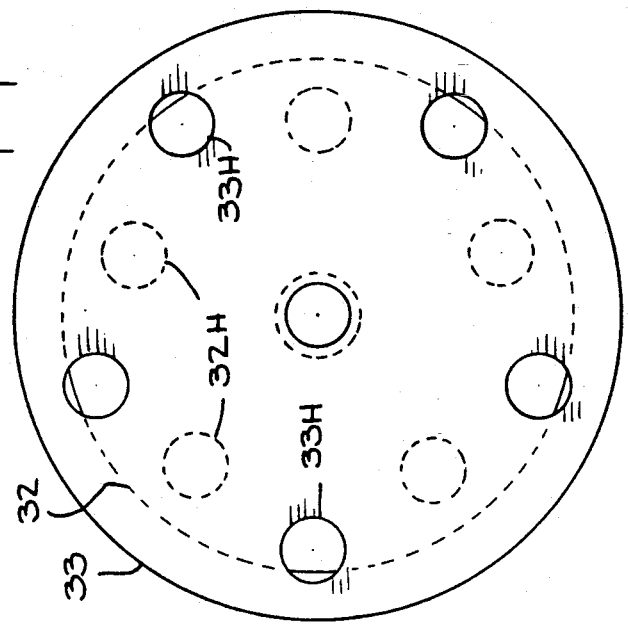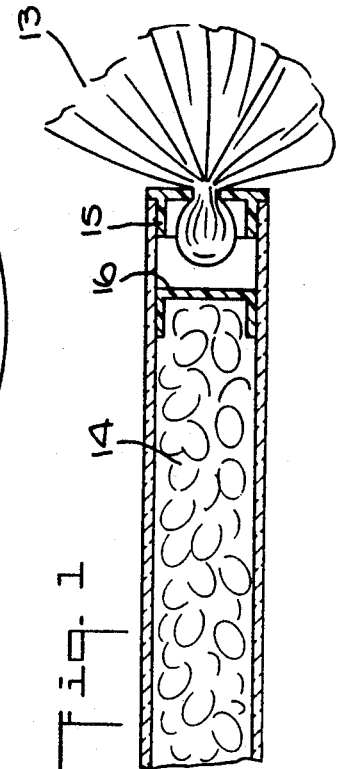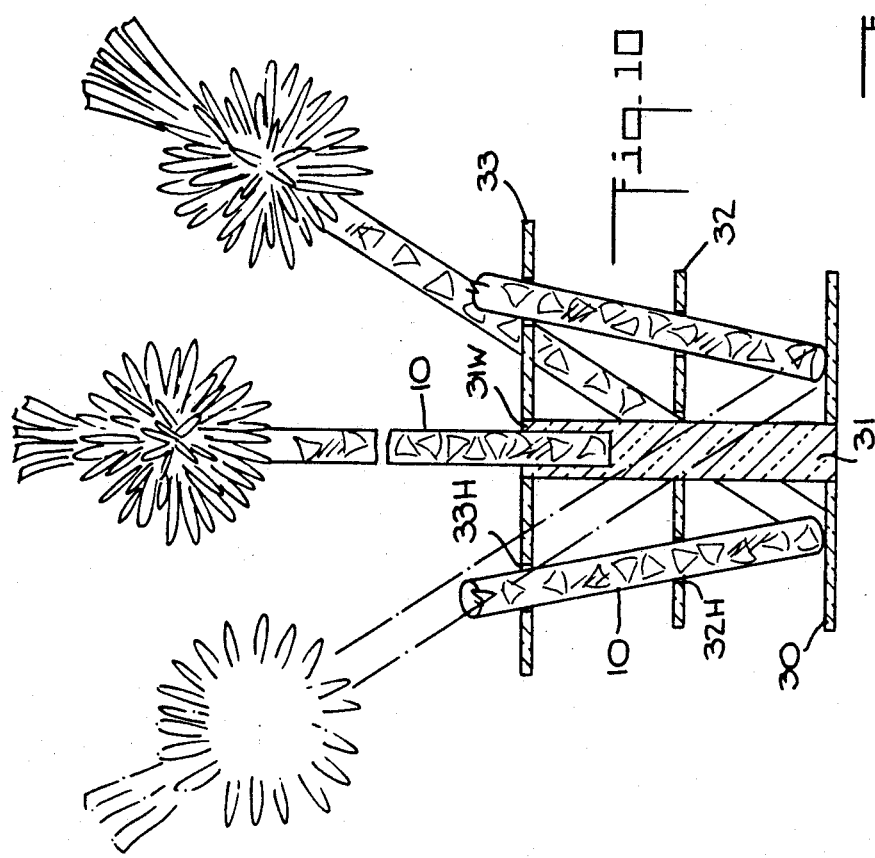

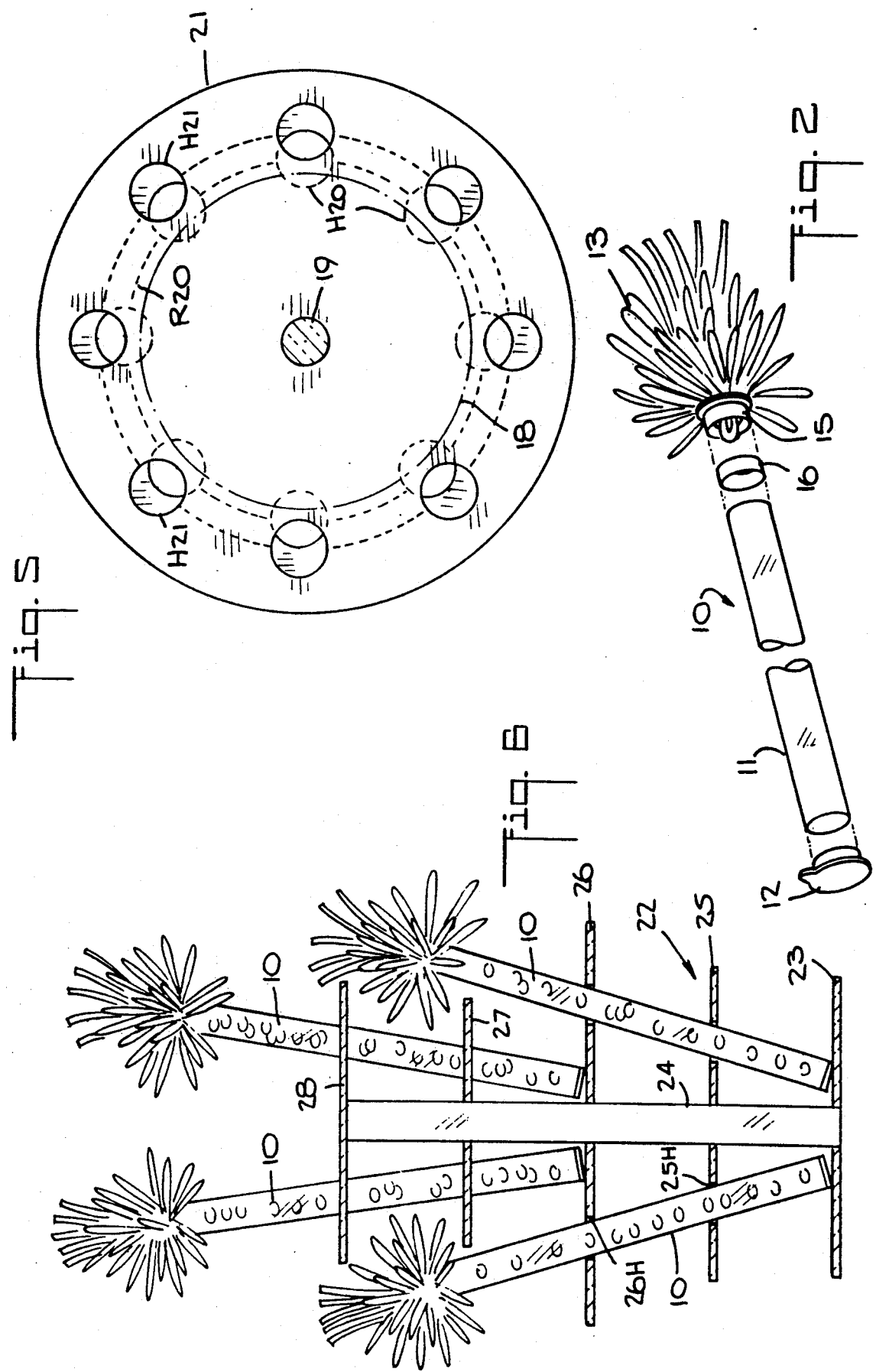

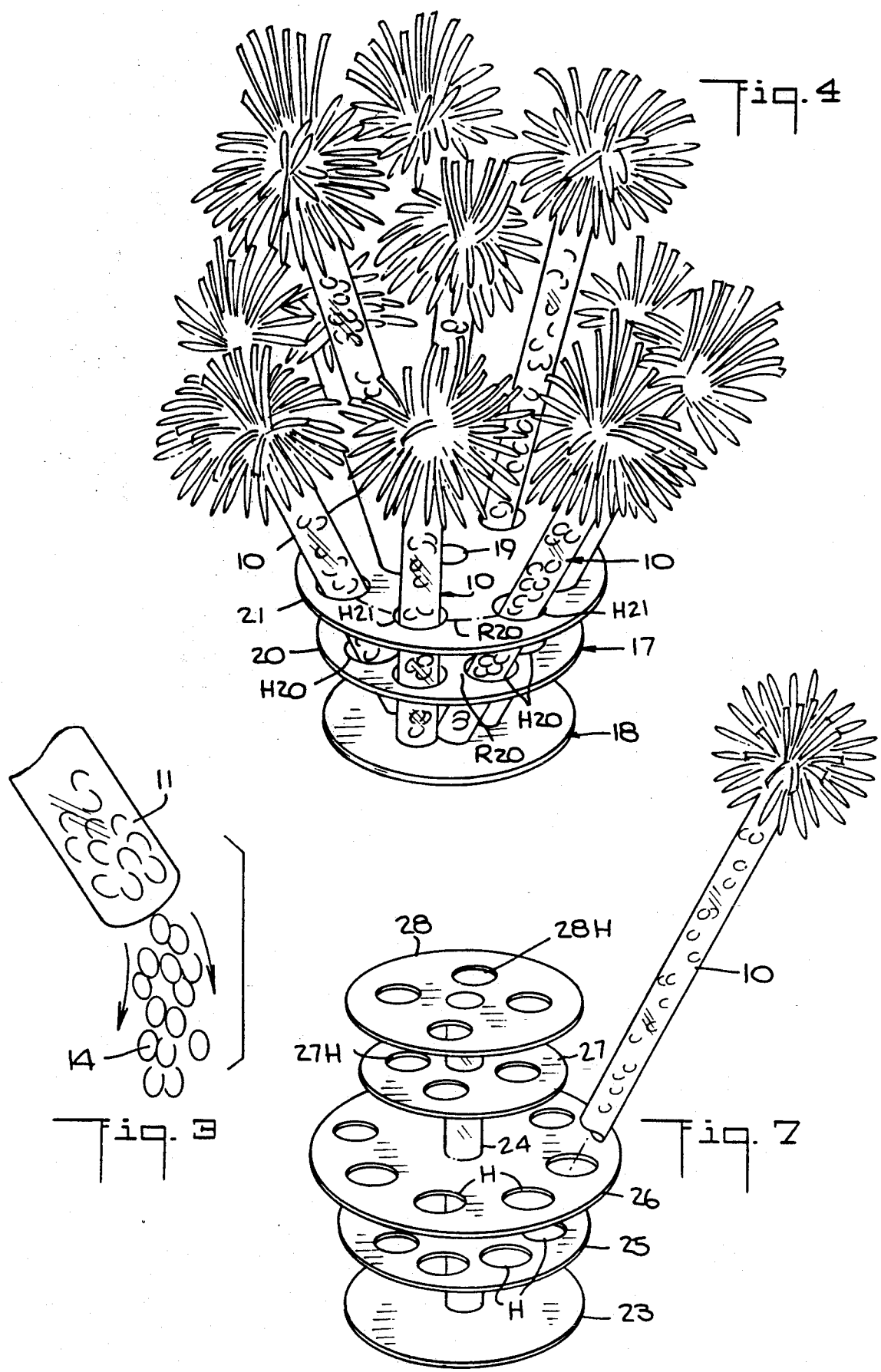

CENTERPIECE ASSEMBLY SIMULATING FLORAL BOUQUET

BACKGROUND OF INVENTION

1. Field of Invention

This invention relates generally to decorative center pieces, and more particularly to a centerpiece assembly which simulates a bouquet of cut flowers, the bouquet being composed of floral-like elements whose stem is formed by a tubular wand filled with pellets of edible candy and crowned with a flower-like pom-pom.

2. Status of Prior Art

On festive occasions, such as an engagement, a confirmation or a birthday party, it is often the practice to adorn each table where the guests gather with a centerpiece in the form of a vase or bowl containing a bouquet of cut flowers. At the conclusion of the party, the flowers are usually distributed to the guests as a memento of the occasion.

When the festive occasion is a birthday party for a child and many of the guests are children, the tables are usually laden with candy. And at the conclusion of the party, each child in attendance is given as a parting gift a small bag of candy, for most children attach little value to flowers.

To entertain young guests at a child's party or on other festive occasions, one often engages for this purpose a professional magician who performs feats of magic, such as making a live rabbit disappear from sight. Essential to this act is a wand which the magician waves to invoke mysterious forces for executing the magical feat. Wands have been associated with the supernatural since time immemorial. Thus fairies, good or bad, are often shown carrying wands, and even the magic flute, whose sounds are reputed to have magical powers, is a wand-like instrument.

The present invention takes into account not only the decorative floral function of a centerpiece for festive occasions, but also the role of candy and wands on such occasions.

Of prior art interest is the Rosenwald U.S. Pat. No. 1,491,926, which discloses a support for a bunch of cut flowers in the form of a vase having installed therein, one above the other, two grids adapted to receive the stems of the cut flowers so as to hold these flowers at different angles.

The flower arranging vase shown in the Fertig U.S. Pat. No. 4,461,118 serves a similar purpose; for the wall of this vase is perforated so that the stems of the flowers inserted in these apertures extend outwardly from the side of the vase, while the stems of the flowers received in the mouth of the vase stand more or less upright.

In the Waddell U.S. Pat. No. 877,145, a cut flower holder is disclosed having a weighted base above which are supported at different levels two apertured plates to receive the stems of the cut flowers.

The Porter U.S. Pat. No. 1,468,743, shows a candy package in the form of a plant growing in a flower pot. The bulk of the candies are contained in the pot, the others being supported above the pot to represent blossoms.

The vase-like display container for candy shown in the Fontlladosa U.S. Pat. No. 3,431,041 has an apertured, dome-shaped cover in whose holes are inserted the stems of lollipops, thereby creating a bouquet of lollipops.

SUMMARY OF INVENTION

In view of the foregoing, the main object of this invention is to provide a centerpiece assembly which simulates a bouquet of cut flowers, each floral element of the bouquet being wand-like and housing a supply of edible candy pellets.

More particularly, an object of this invention is to provide a centerpiece assembly of the above type that includes an array of floral elements, each having a stem formed by a tubular wand of transparent material filled with candy pellets whose color imparts color to the stem.

A significant feature of the invention is that each floral element is a self-contained package for a supply of edible candy, and these elements may therefore be distributed as parting gifts to the guests attending a party in which the centerpiece assembly is placed on a table about which the guests gather.

Also an object of the invention is to provide a centerpiece assembly in which an array of floral elements is supported by a rack so that these elements are clustered in a conical formation to assume the configuration of a bouquet.

Briefly stated, these objects are attained in a centerpiece assembly in which an array of floral-like elements is supported on a rack to simulate a bouquet of cut flowers. Each element in the array has a stem formed by a transparent tubular wand filled with pellets of candy whose color imparts color to the stem. The lower end of the wand is provided with a removable stopper, the upper end having a decorative flower-like pom-pom attached thereto.

The rack, fabricated of transparent material, is composed of a base plate having a center post anchored thereon on which are supported at least two tier plates, one above the other, each tier having a ring of equispaced holes therein coaxial with the center post. The upper tier ring has a diameter greater than that of the lower tier ring, whereby each hole in the upper ring is spaced a greater distance from the post than the corresponding hole in the lower ring. The wand of each floral-like element is inserted into a respective hole in the upper ring and the corresponding hole in the lower ring, with its lower end resting on the base, whereby the elements of the array are outwardly inclined and converge at the base to simulate a bouquet of cut flowers.

BRIEF DESCRIPTION OF DRAWINGS

For a better understanding of the invention as well as other objects and further features thereof, reference is made to the following detailed description to be read in conjunction with the accompanying drawings, wherein:

FIG. 1 is a longitudinal section through a floral-like element according to the invention;

FIG. 2 is an exploded view of the element;

FIG. 3 shows candy pellets being discharged from the wand-like stem of the floral element;

FIG. 4 is a perspective view of one embodiment of a centerpiece assembly according to the invention, in which a group of floral-like elements are supported in a bouquet formation on a rack;

FIG. 5 shows only the rack;

FIG. 6 is a sectional view of a second embodiment of a centerpiece assembly according to the invention, in which the rack is adapted to support two intermeshed bouquets of flower-like elements;

FIG. 7 is a perspective view of the rack included in the second embodiment;

FIG. 10 is a sectional view of this rack; and

FIG. 11 is a top view of the rack.

DESCRIPTION OF INVENTION

Floral-Like Elements

Figure 8:
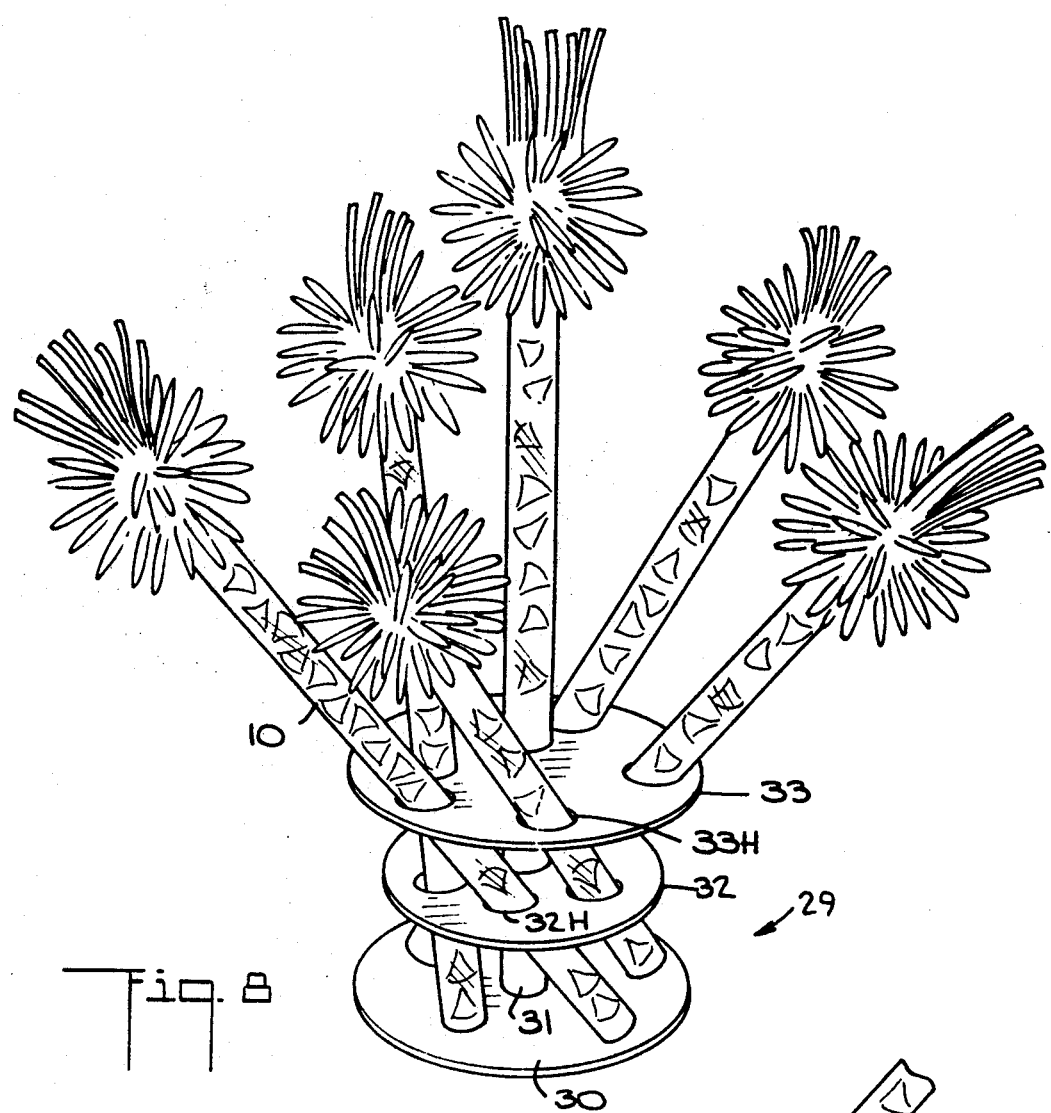
FIG. 8 is a perspective view of a third embodiment of a centerpiece assembly in accordance with the invention.
Figure 9:
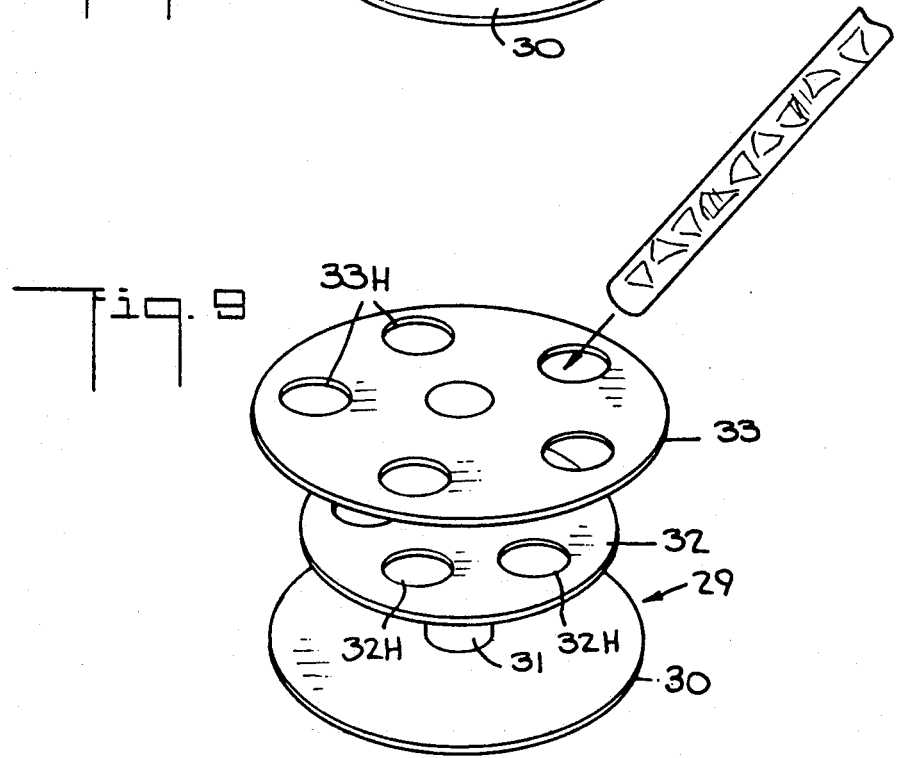
FIG. 9 separately shows the rack included in the third embodiment.

In the various embodiments of a centerpiece assembly in accordance with the invention as shown in FIGS. 4, 6, 8 and 10, an array of floral-like elements, each generally designated by reference numeral 10, is supported on a transparent rack to create the effect of a bouquet of flowers whose configuration depends on the structure of the supporting rack.

Each floral-like element 10, as shown in FIGS. 1, 2 and 3, includes a stem formed by an elongated tubular wand 11 of transparent, rigid, synthetic plastic material, such as an acrylic polymer, polypropylene or PVC. Received in the lower end of wand 11 is a removable stopper 12.

Attached to the upper end of wand 10 and enclosing this end is a pom-pom 13 which simulates a highly decorative flower. Pom-pom 13, which crowns the stem of floral-like element 10, is preferably fabricated of synthetic, plastic film material, such as polyester or polystyrene having vapor-deposited thereon aluminum, amber-colored or other metallic coatings imparting color to the plastic film. Or the material used for forming the pom-pom may be paper, tulle fabric, or laminates of metal foil and plastic film.

In order to simulate a flower, the pom-pom may be composed of a round puff having a single distinctive color, such as violet, yellow or rose, from which puff emerges at its center a cluster of multi-colored ribbons.

Filling the wand-like stem 11 is a pile of colored pellets 14 of edible candy whose sizes are such as to be accommodated within wand 11, the diameter of which is preferably no greater than about one inch. These pellets may be constituted by loose, colored jelly beans, Hershey chocolate kisses wrapped in metal foil, presenting a silver, gold or other metallic color, or M&M chocolate pieces having outer coatings in various colors. Pom-pom 13 is anchored so that its root enters a main cap 15 which encloses the upper end of the wand. Also provided is an inner cap 16 to shield the root of the pom-pom from the candy pellets.

Thus when wand 11 is loaded with a pile of jelly beans, the pile may be created by successive sections of beans in different colors, so that the lowermost section is formed by green-colored beans, the section thereabove by yellow-colored beans, followed by a section of pink colored beans, and so on. In this way, the pile presents a series of contrasting colors. However, when the pile is created by kisses in silver-like foil wrappers, then the entire pile is silvery.

Because the wand is transparent, the resultant stem formed by the candy pellet-filled wand has a color or colors imparted thereto by the pellets. In practice, the stem may be color-coordinated with the flower simulating pom-pom. One can also provide an array of floral elements, the stems of which are in the respective colors of a rainbow and thereby create a highly dramatic bouquet.

In order to fill the wand, stopper 12 is removed therefrom, and when the stopper is returned to the wand, the candy pellets are entrapped in the wand which then becomes a candy package.

First Embodiment of Centerpiece Assembly

As shown in FIGS. 4 and 5, in one preferred embodiment of the centerpiece assembly, the assembly is constituted by an array of floral-like elements 10, supported in a bouquet formation by a rack, generally designated by reference numeral 17.

Rack 17, which is fabricated of transparent, synthetic plastic material of high strength, such as an acrylic polymer or PVC, includes a circular base plate 18. Anchored on base plate 18 is a vertical center post 19 supporting at equi-spaced levels above the base plate circular tier plates 20 and 21.

The first tier plate 20, whose diameter is greater than that of base plate 18, is provided with a circular ring R20 of equi-spaced holes 20, ring 20 being coaxial with center post 19 and concentric with the periphery of plate 20. The second tier plate 21, whose diameter is greater than that of plate 20, is provided with a circular ring R21 of equi-spaced holes H21 equal in number to the number of holes in ring R19. Ring R21, whose diameter is greater than that of ring 20, is coaxial with center post 19 and concentric with the periphery of plate 21. Hence the distance from each hole H21 in ring R21 from center post 19 is greater than the distance of the corresponding hole H20 in ring R20 from center post 19. In order, therefore, for a stem to go through hole H21 into a corresponding hole H20, it must assume an angle relative to the vertical plane.

Floral-like elements 10, equal in number to the number of holes in each ring, have their stems inserted in holes H21 and H20 in rings R21 and R20 of the tier plates so that the ends of the stems rest on base plate 18. Because of the difference in the diameters of these hole rings, the ends of the stems are clustered on base plate 18, the stems being outwardly inclined relative to the base plate to create a conical array of floral-like elements.

Second Embodiment

In the first embodiment of the centerpiece assembly shown in FIGS. 4 and 5, the array of outwardly inclined, flower-like elements are so held by rack 17 as to create a single conical bouquet formation.

In the second embodiment shown in FIGS. 6 and 7, the rack for the centerpiece assembly, generally designated by numeral 22, is constricted so as to create two bouquets in which a higher cluster of flower-like elements 10 forming one bouquet is partially nested within a lower cluster of elements to create a more complex floral arrangement.

Rack 22 is composed of a circular base 23 on which a center post 24 is anchored to support at equi-spaced positions above base 23 tier plates 25, 26, 27 and 28, each having a ring of holes therein., 25H, 26H, 27H and 28H, respectively. The diameter of first tier plate 25 is greater than that of base 23, and the diameter of second tier plate 26 is greater than that of first tier plate 25. The arrangement of holes 25H and 26H is such that, as shown in FIG. 6, the ends of elements 10 which go through these holes rest on base 23 to form a conical cluster.

The diameter of the third tier plate 27 is smaller than that of second tier plate 27, the arrangement of holes 27H and 28H being such that the ends of floral-like element 10 which go through these holes, as shown in FIG. 6, rest on tier plate 26 about center post 24 and within the circular ring of holes 26H on this tier plate. In this way, the lower flower bouquet of floral-like elements 10 rest on base 23, while the higher bouquet of elements which partially nest within the lower bouquet rest on the second tier plate 26 which acts as a base with respect to the higher bouquet.

Third Embodiment of Centerpiece

In the first two embodiments of centerpiece assemblies in which floral-like elements are supported in a bouquet formation on a rack, the location of the holes in the tier plates is such that each floral-like element which goes through an upper tier hole and a corresponding lower tier hole is outwardly inclined relative to the center post of the rack and lies in a vertical plane that passes through the vertical axis of the center post.

In the third embodiment of the centerpiece assembly shown in FIGS. 8, 9, 10 and 11, the rack, generally designated by numeral 29, is composed of a circular base 30 on which a center post 31 is anchored on which are supported a first tier plate 32 whose diameter is smaller than that of base 30 and a second tier plate 33 whose diameter is somewhat greater than that of base 30.

Tier plate 32 is provided with a ring of five equispaced holes 32H, while tier plate 33 is also provided with an equal number of ring holes 33H. Both rings of holes are spaced the same radial distance from the center post 31. But holes 32H in lower tier plate 32 are angularly displaced with respect to the corresponding holes 33H in upper tier plate 33.

Hence, as shown in FIGS. 8 and 10, when floral-like elements 10 are inserted through a corresponding set of ring holes 33H and 32H to rest on base 30, floral-like elements 10 are then angled with respect to center post 31.

And center post 31, as shown in FIG. 10, is provided at its upper end with a cylindrical well 31W into which is inserted the lower end of a floral-like element 10 so that this element which is at the center of the bouquet is upright.

It will be appreciated that in centerpiece assemblies in accordance with the invention, the floral-like elements are identical, the bouquet formation depending on the rack configuration. Because the rack is composed of components, all of which are transparent, the decorative impact of the bouquet depends on the colors of the candies contained in the wand-like stem of the floral-like elements, as well as the formation and the colors of the pom-poms which crown the stems and on the orientation of the elements produced by the supporting rack.

Instead of providing a centerpiece bouquet of real flowers for a festive occasion as well as favors to be distributed to guests at the conclusion of the occasion, one may gain a significant reduction in costs by using a centerpiece assembly in accordance with the invention, which by its very nature functions not only as a centerpiece bouquet but also as a supply of favors to be distributed.

It is not necessary that the wand of the floral-like element have a removable stopper at its bottom end, for in practice this end may be closed, in which case the pom-pom at the upper end of the wand is anchored on a screw-on cap so that the wand can be loaded with candy through the upper end of the wand, the cap being unscrewed when the candy is to be discharged from the wand.

The term "pellet," as used herein, refers to small pieces of candy whose sizes are small enough to fit within the tubular wand, whether or not each piece of candy is wrapped. When the nature of the candy is such that it will soften or melt when the wand is likely to be found in an environment whose ambient temperature is 80 degrees Fahrenheit or higher, then the candy pellets should be so wrapped to prevent leakage of the candy.

While there have been shown and described preferred embodiments of a centerpiece assembly simulating floral bouquet in accordance with the invention, it will be appreciated that many changes and modifications may be made therein without, however, departing from the essential spirit thereof.

I claim:
1. A centerpiece assembly comprising:
   (a) an array of elements simulating flowers, each having a stem formed by a tubular wand filled with candy pellets and a decorative pom-pom attached to the upper end of the wand to simulate a flower; and
   (b) a rack having holes therein to receive the respective stems of the array to support the elements in a bouquet configuration.
2. A centerpiece assembly as set forth in claim 1, wherein said wand is provided at its lower end with a removable stopper.
3. A centerpiece as set forth in claim 1, wherein said wand is formed of transparent material, and said pellets are colored to impart color to the stem.
4. A centerpiece assembly as set forth in claim 1, wherein said wand is formed by an acrylic polymer.
5. A centerpiece assembly a set forth in claim 3, wherein said pellets are formed by colored jelly beans.
6. A centerpiece assembly as set forth in claim 1, wherein said pom-pom is formed by a puff having a distinctive color from which emerges an upward cluster of multi-colored ribbons.
7. A centerpiece assembly a set forth in claim 1, wherein said rack comprises a base plate on which is anchored a center post on which is supported at different levels above the base plate lower and upper tier plates, each having a ring of holes therein coaxial with the center post, the ring on the upper tier having a larger diameter than the ring on the lower tier, whereby the stem of a respective floral element in said array when inserted in a hole in the upper ring and a corresponding hole in the lower ring has its end then resting on the base plate and is outwardly inclined relative to the base plate.
8. A centerpiece assembly as set forth in claim 7, wherein said base plate and said tier plate are circular and are formed of transparent, synthetic plastic material.
9. A centerpiece as set forth in claim 7, wherein said rack further includes third and fourth tier plates supported by said center post at higher levels above said upper tier plate, said third and fourth tier plates each having a ring of holes therein coaxial with the center post, whereby a respective stem of a floral element in a second array of said elements inserted in a hole in the fourth ring and a corresponding hole in the third ring then has its end resting on the upper tier plate and is outwardly inclined relative to said upper tier plate.

10. A centerpiece assembly as set forth in claim 7, wherein said center post has a circular well at its upper end to receive a stem of one of the elements.

11. A floral element adapted to also function as a wand, said element comprising:
(a) a tubular stem formed of transparent material fillable with colored candy pellets which impart color to the stem;
(b) a decorative pom-pom attached to the upper end of the stem to simulate a flower; and
(c) a removable stopper at the lower end of the stem to hold the pellets therein.

12. An element as set forth in claim 1, wherein said pom-pom has a root which extends through an end cap attached to the upper end of the stem, and further including an inner cap secured to said stem to separate the root of the pom-pom from the candy pellets.

* * * * *